United States Patent [19]

Hirose

[11] Patent Number: 4,519,524

[45] Date of Patent: May 28, 1985

[54] PARTS FEEDER

[76] Inventor: Yoshiyuki Hirose, 7-24, Hirose 2-chome, Shimamoto-cho, Mishima-gun, Osaka, 618, Japan

[21] Appl. No.: 378,171

[22] Filed: May 14, 1982

[30] Foreign Application Priority Data

May 14, 1981 [JP] Japan .............................. 56-073224

[51] Int. Cl.³ .............................................. B65H 9/00
[52] U.S. Cl. ...................................... 221/167; 198/757
[58] Field of Search ............... 221/156, 167, 205, 203; 198/756, 757, 766; 414/306

[56] References Cited

U.S. PATENT DOCUMENTS

| | | | |
|---|---|---|---|
| 2,991,872 | 7/1961 | Keegan | 198/766 |
| 3,103,165 | 9/1963 | Tripp | 221/167 X |
| 4,362,455 | 12/1982 | Hirose | 198/757 X |

Primary Examiner—Stanley H. Tollberg
Attorney, Agent, or Firm—Darby & Darby

[57] ABSTRACT

A parts feeder which executes the selection of articles and lets those selected articles transfer to the fixed trough (in-line feeder) smoothly, at the time of which linear transfer of the articles is effected not within the bowl, but at the in-line trough section connected directly to the bowl, wherein the transfer and conveyance of many different kinds of articles is conducted on only one apparatus by replacing the in-line troughs as needed.

5 Claims, 11 Drawing Figures

PARTS FEEDER

BACKGROUND OF THE INVENTION

This invention relates to a parts feeder wherein a bowl performing a horizontally and non-linearly rotating vibration and an in-line trough are incorporated in one, and which lines up the articles to be worked on in the in-line trough section.

In a parts feeder of a sort heretofore in wide use, a bowl being provided with a spiral conveying track on its inner surface is supported tiltingly by a number of sets of plate springs so as to be put into the simple harmonic motion in the oblique direction with the aid of the plate springs and solenoids. It follows from this that the bowl comes to effect not only the rotating vibration but also the vertical vibration, as a result of which precision and fragile articles (works) are threatened with breakage, noise is easily generated, and further it is difficult for the bowl to execute the conveyance of thin articles or the transition of small-sized ones toward the in-line feeder, and so on. The parts feeder of this type has various problems heeding solution.

SUMMARY OF THE INVENTION

The object of this invention is to provide a parts feeder which eliminates the above-mentioned defects, is excellent in conveyance of thin articles and small-sized ones, and has the ability to selectively pick up even articles having been heretofore held to be impossible to sort, and to perform the good transition of articles toward a fixed trough (in-line feeder); and which is characterized in that the in-line formation of the articles is executed not in the interior of the bowl, but in the in-line trough section connected directly to the bowl, and in this way the linear transfer and conveyance of various kinds of works can be conducted with only one apparatus by replacing a number of in-line troughs each time.

DETAILED DESCRIPTION

The invention will be now described more particularly with reference to the examples shown in the accompanying drawings.

Figure 1:
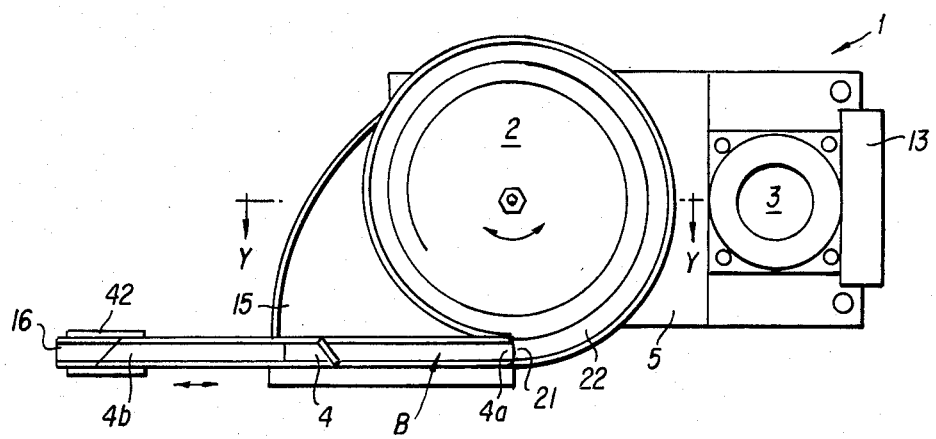
FIG. 1 is a plan view showing an example of the parts feeder according to the invention.
Figure 2:
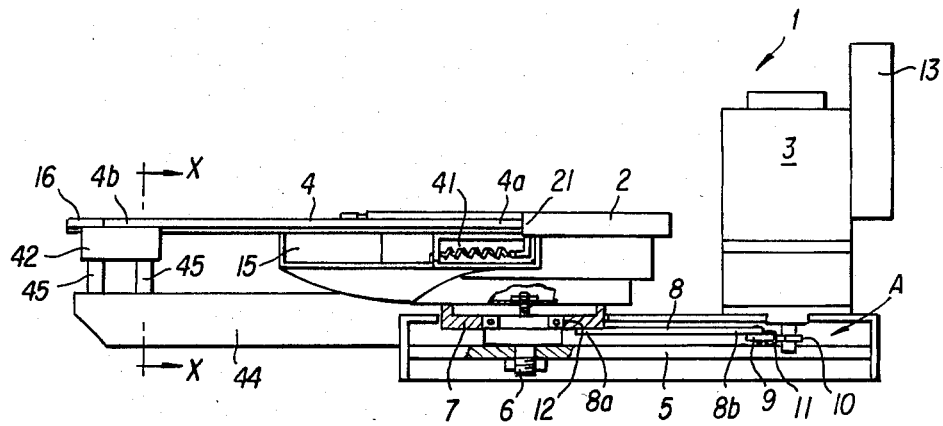
FIG. 2 is a front view of the same as in FIG. 1.

FIGS. 1 and 2 show an example of the parts feeder(1) according to the invention, wherein a bowl(2), a motor(3) for putting said bowl(2) into a horizontally and non-linearly rotating vibration, and an in-line trough(4) are incorporated on a base(5) in one.

To begin with, the bowl(2) is secured fixedly on a saucer(7) which is rotatably supported by a main shaft(6) that is fastened securely to one side from the central part in the direction of the breadth of the base, and the bowl(2) is driven by the motor(3) through a cam mechanism(A). This cam mechanism(A) is composed of an oscillating arm(8) which is fixed at its basal part(8a) on the underside of the saucer(7) and has a cam follower(9) at its front part, a cam(10) rotated by the motor(3), and a spring(11) compressing the cam follower(9) to the cam(10). Incidentally, in the figure, the reference numeral(12) indicates a bearing supporting the saucer(7) on the main shaft(6). The geometry of the cam(10) and the rotational frequency of the motor(3) must be selected in such a manner that the inertial force when making the bowl(2) rotate in the direction of conveying the articles may be smaller than the frictional force between the works(W) and the conveying track(22), and the inertial force when in the reverse direction is larger than the frictional force.

Figure 4:
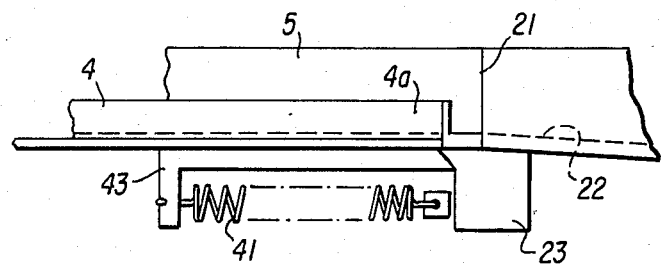
FIG. 4 is an enlarged view showing the connecting part of the in-line trough to the exit of the conveying track.
Figure 5:
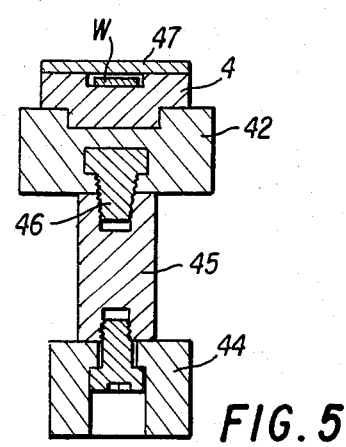
FIG. 5 is a cross-sectional view taken on line X—X in FIG. 2.
Figure 6:
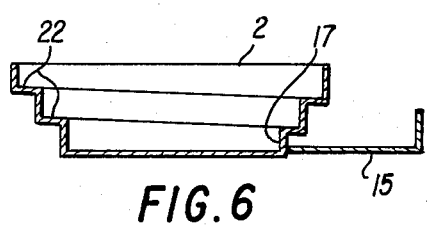
FIG. 6 is an end view in section taken on line Y—Y in FIG. 1.
Figure 7A:
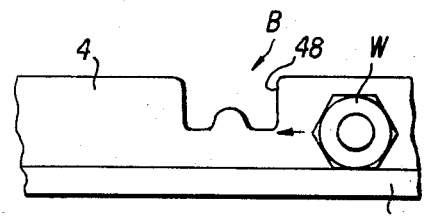
FIG. 7(a) is a plan view of the works-tooling section.
Figure 9:
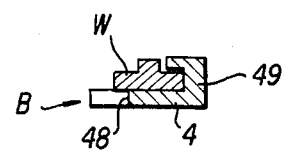
FIGS. 8 to 10 are cross-sectional view of the article transfer sections different from one another.
Figure 7B:
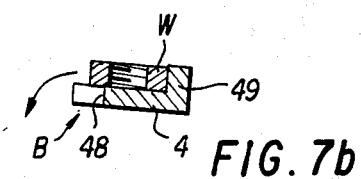
FIG. 7(b) is a cross-sectional view thereof.
Figure 8:
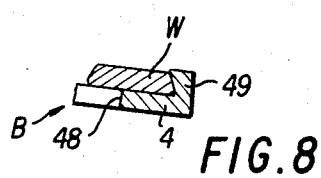

Next, the in-line trough(4) is slidingly pressed at its basal part(4a) close to the exit(21) of the conveying track of the bowl(2) by a spring(41)(FIG. 4), and is supported at its tip part(4b) on a trough support(42)-(FIG. 5). The neighborhood of the basal part(4a) of this in-line trough(4) forms a linear article transfer part(B), under which is disposed a bucket(15) receiving the works which have fallen from the article transfer part(B).

This basal part(4a) of the in-line trough(4) is pressed close to the exit(21) of the conveying track(22) by a spring(41) which is hung on an L-shaped fitting being fixed on the undersurface of the basal part(4a). When the bowl(2) rotates as shown in FIG. 1, this basal part-(4a) is pushed toward the exit(21) of the conveying track to move front and rear in the direction of arrows, namely, of the tangent of the bowl. By the way, the tip of this basal part(4a) is made in a rounded shape to reduce contact resistance. Furthermore, the basal part-(4a) moves neither up and down nor left and right since a protrusion(23) fixed on the undersurface of the exit of the conveying track eats into an incision between the basal part(4a) and the head of the L-shaped fitting(43). A trough support(42) holding up the front part(4b) of the in-line trough is fixed fast on a base rod(44) being extended forward from the base(5) through struts(45), and serves to guide the in-line trough(4) so as to oscillate in the tangent direction of the bowl(2). Therefore, the trough support(42) is desirably made of some material of low friction such as, for example, nylon resin containing molybdenum sulfide, or maybe substituted for by ball or roller bearing. FIG. 5 is an end view of the trough support part in section taken on line X—X in FIG. 2, in which the reference numeral(46) indicates a screw interconnecting the trough support(42) and the strut(45), while the reference numeral(47) indicates a cover of the upper part of the second half of the in-line trough(4).

Figure 3:
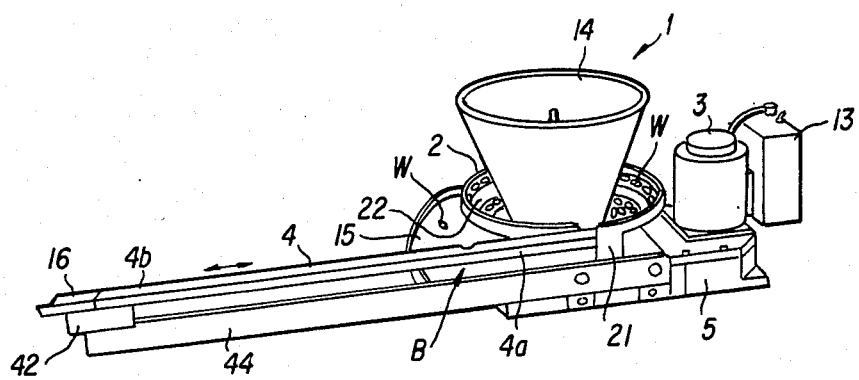
FIG. 3 is a perspective view showing another example.

When the motor(3) starts to rotate and the bowl(2) is put into horizontally and non-linearly rotating vibration, then the articles(W) are carried clockwise along the conveying track(22) of the bowl(2) and are sent out from the exit(21) of the conveying track toward the in-line trough(4). In the figure, the reference numeral(13) indicates a regulator of rotational frequency, by which is set the optimum vibraion frequency depending on the type and size of the work. Further, if a hopper(14) is provided within the bowl(2), as shown in FIG. 3, it is possible to place thereinto many articles at a time and to store them thereat, or lighten the burden of the motor(3) by combining the hopper(14) with a separate bottom.

The article or work, which is sent into the in-line trough(4), moves quietly and glidingly forward and reaches the article transfer section(B) of the trough without shaking up and down or left and right because the in-line trough(4) is acting in concert with the rotational vibration of the bowl(2) and makes the same horizontally and non-linearly longitudinal vibration as the trough support(42) and the protrusion(23) under the regulation of the latter two.

Figure 10:
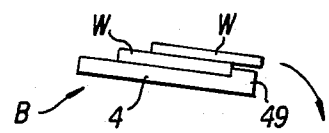

This article transfer section(B) is provided with a notch(48) or a protrusion(not shown) corresponding to the size of the articles in the middle (in the figure: to the front side) of the in-line trough(4), as shown in FIGS. 7 to 10, thereby making only the article turning toward the required direction pass through, but letting the other works fall down. The feature of this invention lies in the fact that the selection of articles can be done by making use of the unbalance between the left and right barycenters for the purpose of making the works move forward in the horizontal state, so that the works are enable to be transferred through the easy and accurate detection of the very trifling difference between the upper and lower surfaces, as illustrated in the figures. The article transfer section shown in FIG. 10 is provided with a brim(49) a little lower than the thickness of the article(W), whereby it permits passage of articles only one article even when the more than two articles come thereto one over another, and furthermore it has the ability also to transfer articles of about 0.2 m/m.

The articles which pass through the article transfer section(B) unhindered reach the front part of the in-line trough(4) under the protection of the cover(47), when they are transferred to a fixed trough(16) or an in-line feeder being connected to some assembly machine (not shown). The distance between the fixed trough(16) and the in-line trough(4) is sufficient to be about 0.5~3 m/m though it depends on the frequency of vibration or the shape of the work, but if the border between the two is made oblique as shown in the figure, it becomes possible to make the transfer of the works more smoothly.

On the other hand, the articles being let to fall as off-grade are received by a bucket(15) which is incorporated with the bowl(2) in one, wherefrom they are sent back passing through a back hole(17) built in the bowl(2) again into the bowl(2) under the oscillation of the bucket without requiring any man power.

The parts feeder according to the invention is not to be limited only to the example described above. Structural changes may be made in, for example, the way of supporting the bowl, the driving system by the use of the motor, and others, if the change is able to produce the same satisfactory effect. Particularly as for the form of the conveying track within the bowl, it is not confined specifically to the only one as given in the example, but it is allowable to adopt any other formation, or to divert various types to this purpose.

As above mentioned, the transfer at the in-line trough according to the invention is highly stable because the transfer being performed here in a straight line unlike the transfer or movement in the interior of the bowl is of high transfer efficiency, and is never blocked. In addition, the parts feeder according to the invention has other kinds of advantages never seen in conventional parts feeders such that the parts-feeding to automatic assembly machines can be done at will because of the in-line trough being able to be connected directly to the fixed trough, so that in this parts feeder, one motor suffices for the driving source and the whole body is simple in structure, easy to control, and low in price. Further, that it can be put to practical use for various kind of works by the use of in-line troughs, and further that it has the ability to transfer and feed even small-sized articles, especially those thin in the thickness with certainty and accuracy.

I claim:

1. A parts feeder comprising:
   a horizontally rotatable bowl having a conveying track on an interior surface thereof;
   a motor coupled to drive said bowl in a horizontal rotatable oscillatory vibration, wherein said bowl rotates in a first and second direction, the acceleration of said bowl in said first direction being greater than in said second direction; and
   at least one in-line trough having a basal part slidingly coupled to an exit of said conveying track and being slidingly supported thereof so as to be longitudinally moveable;
   wherein a portion of said in-line trough is formed into a linear article transfer section for formation in-line of articles therein.

2. A parts feeder as set forth in claim 1, wherein said in-line trough is made exchangeable depending on said articles.

3. A parts feeder as set forth in claim 1 or 3, wherein the front end part of said in-line trough is aligned with a fixed trough across a small gap.

4. A parts feeder as set forth in claim 1 or 2 or 3, wherein beneath said article transfer section is provided a bucket which receives selectively excluded articles and sends them back again into said bowl.

5. The parts feeder according to claim 4 wherein said in-line trough is coupled to said bowl to move in a linear direction in conjunction with said oscillatory motion of said bowl.

* * * * *